United States Patent Office 3,025,001
Patented Mar. 13, 1962

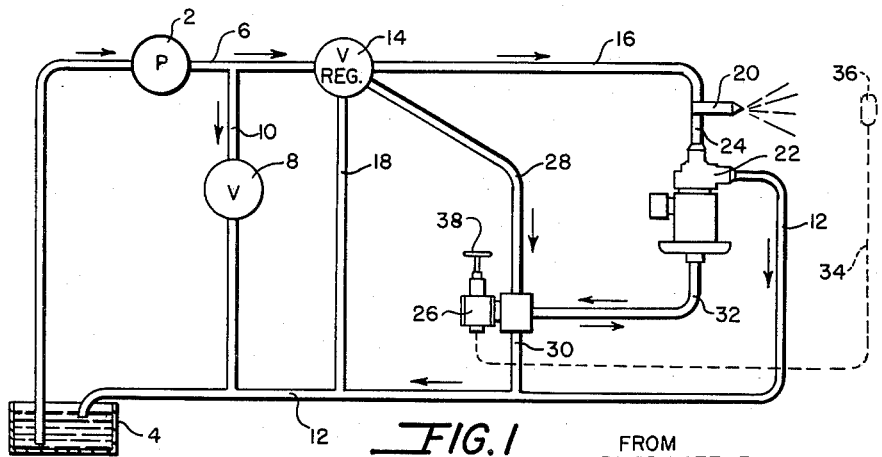
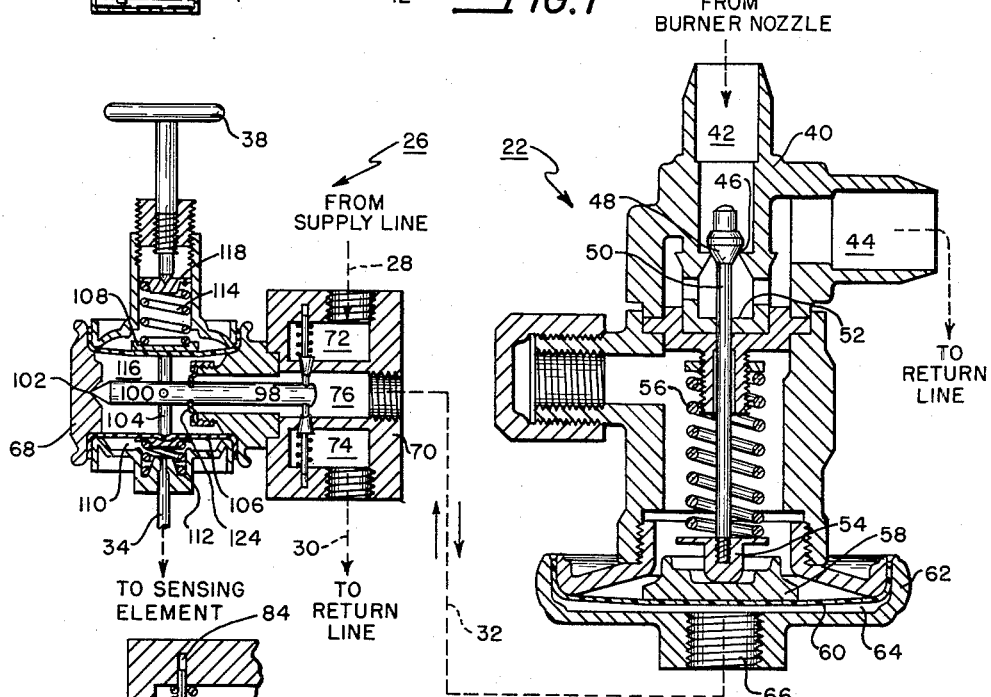
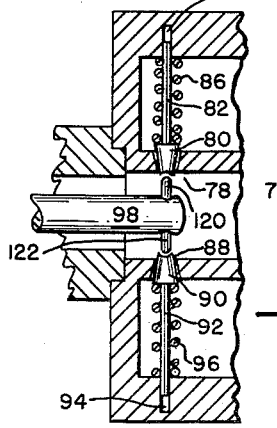

3,025,001
FLOW CONTROL SYSTEM
Aubrey H. Robson, Rock Island, Ill., assignor to American Air Filter Company, Inc., Louisville, Ky., a corporation of Delaware
Filed Apr. 18, 1960, Ser. No. 22,856
4 Claims. (Cl. 236—80)

This invention relates generally to a flow control system of the type in which a pilot valve responsive to an imbalance between a sensed and a desired condition controls the operation of a main valve.

One object of the invention is to provide a pilot valve-main valve arrangement wherein the flow control position of the main valve is reset by operation of the pilot valve in response to changes in certain external operating conditions producing a change in the produced condition.

Another object is the provision of a valve arrangement wherein a pilot valve which is responsive to only the produced condition is operative to reset the main valve in response to variations requiring a changed flow rate of the controlled medium to maintain the desired produced condition.

Another object is the provision of such a valve arrangement wherein hunting of the main valve in assuming and holding a proper flow control position is minimized.

One specific object is the provision of a pilot valve-main valve arrangement particularly adapted for use in fuel control systems for that type of portable air heater required to provide a controlled air outlet temperature irrespective of substantial variations in ambient air conditions encountered during different operating periods and in varying operating localities.

While the invention is applicable to other apparatus, the principles of the invention are well suited for explanation in connection with a bypass fuel control system for portable air heaters of the liquid fuel burning type. A heater having such a bypass fuel control system is described in Hubbard U.S. Patent 2,758,591, issued August 14, 1956.

In such a heater it is usually required that the heater be controlled to provide a selected outlet air temperature. To this end, the outlet air temperature produced by the heater is sensed and a valve in the burner nozzle fuel return line is controlled in accordance with the differential between the sensed temperature and a selected temperature to which the valve is adjusted. With an outlet air temperature above the control point, the valve opens to bypass more fuel through the burner nozzle so that less fuel is discharged into the burner; conversely with an outlet air temperature below the control point, the valve closes to increase the rate at which fuel is discharged into the burner. Such valves are well known and operate in an opening and closing direction in response to an imbalance one way or another between, on the one hand, the vapor force derived from a fluid expansion element in the heated air outlet, and on the other hand, the selected force established by adjusting the valve spring to a selected temperature. Thus, when the force exerted by the valve spring, and the opposing force of the vapor pressure are balanced the valve will assume a position giving a particular rate of fuel discharge into the burner and consequently a particular outlet air temperature. Now however, if the character of the ambient air being heated changes in respect to its temperature or density, or if it is desired to change the volume of ventilating air discharged from the heater, the given fuel rate will not produce the same outlet temperature. Thus, the valve will assume a new position which, under the changed ambient air conditions, will produce a different outlet air temperature from that originally selected. In other words the temperature selector valve is adjusted to a position approximating a selected temperature, and the heater operator must thereafter further adjust the valve in view of the observed outlet air temperature to obtain a precise selected outlet temperature.

In applying the principles of the present invention to a control system for such an air heater, an arrangement is provided wherein a main valve for regulating the rate of fuel discharge into the burner is controlled in accordance with the pressure exerted by an actuating fluid admitted to a diaphragm chamber of the valve. The pressure of the fluid admitted to the diaphragm chamber of the main valve is in turn regulated by a pilot type valve which is connected to receive the fluid under pressure and admit it to, or exhaust it from, the diaphragm chamber of the main valve in response to a departure in sensed outlet air temperature in one direction or another from a selected outlet air temperature. In accordance with one feature of the invention, hunting of the main valve is minimized by arranging the pilot valve to lock or seal a static quantity of fluid in the main valve diaphragm chamber when the desired temperature condition is attained.

The invention will be explained in some detail in connection with the accompanying drawing illustrating apparatus incorporating the invention in one embodiment by way of example, and wherein:

FIGURE 1 is a somewhat diagrammatic view of a fuel control system for an air heater of the burner bypass type to which the invention is well suited for application;

FIGURE 2 is a sectional view illustrating a suitable construction of a main valve and a pilot valve;

FIGURE 3 is an enlarged fragmentary sectional view of the inlet and exhaust valve portion of the pilot valve.

Referring to the drawings, FIGURE 1 illustrates an air heater fuel control system with the valve apparatus of the invention incorporated therein. In the illustrated system a liquid fuel such as gasoline is drawn by pump 2 from the tank 4 and is supplied under pressure to a fuel line 6. If valve 8 in primary bypass line 10 is open, the fuel is returned to the tank by way of a common return line 12. If valve 8 is closed, the pressure regulating valve 14 opens and passes fuel at a predetermined pressure (such as 150 p.s.i.) through a first outlet port into nozzle supply line 16 with excess fuel returning to the common return line 12 by way of secondary bypass line 18.

The discharge rate of fuel from the nozzle 20 into the burner (not shown) is controlled by a main or throttling valve 22 in the nozzle return line 24. The more valve 22 is throttled, the higher the rate of fuel discharge into the burner; and conversely, the less valve 22 is throttled, the lower the rate of fuel discharge into the burner. In either case, the fuel passing through valve 22 flows into the common return line 12 and back to the tank.

The extent to which main valve 22 is throttled is controlled by a pilot or controller valve 26 which is connected by fluid supply line 28 to a second outlet port of regulating valve 14, by fluid relief line 30 to the common return line 12, and by fluid line 32 to main valve 22. Valve 26 is also connected by a capillary line 34 to a temperature sensing element or bulb 36 charged with a volatile fluid and suitably located in the heated ventilating air outlet of the heater to sense the heater outlet air temperature. A rotatable handwheel 38 or the like is provided to regulate the pilot valve temperature setting as will be explained later.

Details of the structure and functional relationship of the main valve 22 and pilot valve 26 in the system will now be described in connection with FIGURE 2.

The main valve 22 includes a body 40 having a fuel inlet 42 connected to the nozzle return line 24 and a fuel outlet 44 connected to the common return line 12. An interior web separates the inlet and outlet and defines an orifice 46 in which a cone-like valve member 48 is movably situated to vary the effective opening of the orifice and consequently vary the rate of fuel flow from inlet to outlet. The valve cone 48 is carried by one end of a valve stem 50 which passes through an interior stem seal and guide element 52 and has its opposite or lower end screwed into an interiorly threaded cap 54 provided with an annular flange against which one end of a coil spring 56 seats. The cap 54 is biased downwardly by the spring 56 against a diaphragm pad 58 carried by diaphragm 60 in diaphragm housing 62. The diaphragm 60 serves as a displaceable wall of an expansible-contractible fluid chamber 64 connected to receive or discharge fluid through port 66 which is connected by line 32 to the pilot valve 26.

As noted, the coil spring 56 acts against the flange of cap 54 and urges the cap and stem 50 downwardly toward a position seating the valve cone 48 in the orifice 46. The force exerted by a fluid pressure acting against the diaphragm 60 in chamber 64 opposes the tension of the spring 56 so that the position which the valve cone 48 will assume relative to the orifice 46 will depend upon a balance of the two opposing forces. Thus, with a rise in pressure in chamber 64 the main valve 22 will tend to open, while with a fall in pressure the main valve will tend to close.

The pilot valve designated generally as 26 includes a main housing portion 68 and a flow housing portion 70. The flow housing portion 70 has a fluid inlet chamber 72 connected to receive fluid under a predetermined pressure from line 28, a fluid outlet or exhaust chamber 74 connected to the common fuel return line 12 by line 30, and an intermediate chamber 76 in communication with fluid pressure chamber 64 of main valve 22 through connecting line 32. Details of the flow housing portion will be explained with reference to both FIGURES 2 and 3.

The wall member dividing the inlet chamber 72 from the intermediate chamber 76 is provided with a port 78 adapted to receive a conically shaped valve member 80 which will be termed an inlet valve and which is fixed to one end of a stem 82. The opposite end of the stem 82 is received in a guideway 84 formed in an exterior wall member of the flow housing portion, and a coil spring 86 acting against the valve member 80 at one end and against the opposite wall at the other end urges the valve member 80 toward a closed position.

The fluid outlet chamber includes essentially the same arrangement of elements including a port 88, a valve member 90 here termed an outlet or exhaust valve, a valve stem 92, a guideway 94, and a coil spring 96 urging the valve 90 toward a closed position.

Opening of valve members 80 and 90 of the pilot valve is effected by vertical movement of the right end 98 of a rocker arm which extends from the main housing portion into the flow housing portion. The rocker-arm left end 100 is fulcrumed in an indentation 102 formed in the interior surface of the main housing portion. A pin 104 pivotally secured in a generally right angle relationship to an intermediate point on the rocker arm engages a lower diaphragm-pad assembly 106 at its lower end, and engages an upper diaphragm-pad assembly 108 at its upper end. The lower diaphragm 106 forms one wall of an expansion chamber 110 which is in communication with the capillary tube 34 and temperature sensing bulb 36 (FIGURE 1). A coil spring 112 in the expansion chamber 110 biases the diaphragm-pad assembly 106 upwardly to insure engagement of the pin 104 therewith and to exert a force substantially balancing the normal atmospheric pressure in the cavity 116 of the main housing portion.

The upper diaphragm-pad assembly 108, against which the bottom end of a temperature selection coil spring 114 acts to bias the assembly downwardly, also serves to form a wall of the interior cavity or chamber 116 in the main housing portion. The upper end of the spring 114 engages a pad element 118 which may be adjusted in a vertical direction by rotating the temperature selection handwheel 38 to vary the tension of the spring 114.

The right hand end 98 of the rocker arm carries an upper projecting pin 120 and a lower projecting pin 122 aligned with the axes of and adapted to engage the valve members 80 and 90 upon a predetermined movement of the rocker arm right end upwardly or downwardly respectively. As will be apparent from FIGURE 3, when the rocker arm is in an intermediate position, the valve members 80 and 90 are both seated and seal their respective ports.

The cavity 116 of the main housing portion, and the pressure chamber 76 of the flow housing portion are isolated from each other by a flexible diaphragm 124 sealing the passage between these chambers and mounted to provide negligible interference with see-saw movement of the rocker arm.

Considering now the operation of the pilot valve, the handwheel 38 is rotated to select a temperature which it is desired to maintain at the ventilating air outlet of the heater. When this selected temperature is sensed by the bulb 36 and causes a corresponding force to be exerted against the lower diaphragm 106 through the medium of the vapor pressure generated in the lower chamber 110, the tensile force of coil spring 114 will balance the opposing vapor pressure force and the rocker arm will be in an intermediate position with both valves 80 and 90 closed. With an increase in compression of spring 114 by rotating the handwheel 38 in one direction, a higher temperature must be sensed by the bulb 36 to provide a balanced position of the rocker arm. Conversely, with a decrease in compression of spring 114, a lower temperature sensed by bulb 36 will provide a balanced position of the rocker arm.

Assume now that a given heater outlet temperature has been selected. When burner combustion is started, the right end 98 of the rocker arm will be depressed by the force of coil spring 114 exceeding the opposing vapor pressure force in chamber 110 so that exhaust valve 90 will be open while inlet valve 80 will be closed. Thus, the fluid pressure in chamber 76 of the pilot valve, line 32, and pressure chamber 64 will be negligible, and spring 56 of the main valve will hold cone valve 48 in a seated position. Under this condition of maximum throttling, burner combustion will be at a maximum. As the outlet temperature sensed by bulb 36 increases in response to continuing combustion, the vapor pressure in chamber 110 of the pilot valve increases until at an outlet temperature exceeding the selected temperature the right end 98 of the rocker arm will be moved upwardly. This permits exhaust valve 90 to close and causes supply valve 80 to open so that fluid under pressure in inlet chamber 72 flows into intermediate chamber 76, line 32 and pressure chamber 64 of the main valve 22. The fluid pressure in chamber 64 displaces diaphragm 60 upwardly against the force of the coil spring 56 and thereby moves cone valve 48 from its seat orifice 46 so that the main valve throttles the nozzle return line 24 to a lesser degree and consequently decreases the rate of fuel discharge into the burner.

So long as the outlet temperature sensed by bulb 36 exceeds the selected outlet temperature, the right end 98 of the rocker arm will be above its balanced position thereby permitting additional fluid to pass through open inlet valve 80 to increase the pressure in chamber 64. When the effect of the decreased throttling resulting therefrom is sensed by bulb 36 cooling, and the vapor pressure in chamber 110 decreasing to a point where the rocker arm right end 98 is forced downwardly to its intermediate position permitting valve 80 to close, the quantity of fluid in pressure chamber 64 will be locked in so that the main valve 22 will be held in a particular open position giving a corresponding throttling action. Upon a drop in sensed outlet air temperature sufficient to cause the rocker arm right end 98 to open valve 90, the main valve will move toward a closed position increasing the throttling effect and consequently increasing the rate of fuel discharge into the burner. Conversely, a rise in sensed outlet air temperature decreases the throttling effect and decreases the rate of fuel discharge into the burner.

It will be noted that projecting pins 120 and 122 on the rocker arm right end 98 are sized to permit rocking of the arm to a minor degree without opening either inlet valve 80 or exhaust valve 90. This prevents minor departures in heater outlet air temperature from a selected temperature from causing a constant hunting of the throttle valve 22. It will be appreciated that selection of the pin dimensions will be determined in accordance with the sensitivity of temperature control desired.

Now, assume that outlet air of the selected temperature is being delivered from the heater and it is desired to reduce the quantity of air delivered by one half while maintaining the selected outlet temperature. Upon initially reducing the air flow, the given opening of the throttling valve 22 (occasioned by the particular fluid pressure exerted by the quantity of fluid locked in) will provide a rate of fuel discharge into the burner in excess of that required to maintain the selected temperature. Thus, through the functioning of the elements heretofore described, the rocker arm right end 98 will rise and thereby permit the introduction of additional fluid causing an increase in fluid pressure in chamber 64 of the throttle valve. Consequently the cone valve 48 will open further and the decreased throttling effect will decrease the rate of fuel discharge into the burner. While some hunting occurs in the attempt of the system to establish the proper locked-in fluid pressure to obtain the proper fuel rate for the operating conditions, the proper pressure is ultimately achieved and results in a stabilized rate of fuel discharge into the burner corresponding to selected outlet temperature for the reduced air volume. Assuming that subsequently an increase in ventilating air flow is desired, an opposite control reaction obviously occurs. Similarly, with substantial changes in the temperature or density of the ambient air, the main valve is automatically reset by varying the fluid pressure in the pressure chamber 64 to compensate for the changed external conditions.

As will be appreciated, the invention is particularly applicable to a fuel control system of the burner bypass type since, in such a system, a source of fuel at a predetermined pressure is constantly available as a pilot force for powering the main valve, irrespective of the degree to which the main valve is open. It will also be appreciated that a separate source of a pressurized fluid might be used depending upon the environment in which the valve arrangement of the invention is applied.

Having described my invention, I claim:

1. In a fuel control system for a bypass type liquid fuel burner: means supplying fuel under pressure to said burner; a throttle valve in a fuel return line connected to said burner for varying the rate of fuel discharge into said burner, said throttle valve including means biasing it toward a closed position and a fluid pressure chamber having a diaphragm displaceable in a direction to open said valve in response to an increasing fuel pressure imposed against said diaphragm; means for regulating the fuel pressure in said chamber including fuel supply line means connecting said chamber to said fuel supply means through a normally closed inlet valve therein operable when open to admit fuel under pressure to said chamber, and fuel exhaust line means connecting said chamber to said fuel return line through a normally closed exhaust valve therein operable when open to relieve fuel pressure in said chamber; and means for controlling said inlet and exhaust valve in response to a differential between a selected temperature condition and a temperature produced by said burner, said control means including actuating means for opening said inlet valve in response to a produced temperature above said selected temperature condition whereby the pressure in said chamber is increased and said throttle valve is moved toward an open position, and for opening said exhaust valve in response to a produced temperature below said selected temperature condition whereby the pressure in said chamber is decreased and said throttle valve is moved toward a closed position, said actuating means having an intermediate position corresponding to said selected temperature condition in which both said inlet valve and exhaust valve are closed to lock a static quantity of fluid in said chamber.

2. In a fuel control system for a bypass type liquid fuel burner: means supplying fuel under pressure to said burner; a throttle valve in a fuel return line connected to said burner for varying the rate of fuel discharged into said burner, said throttle valve including means biasing it toward a closed position and a fluid pressure chamber having a diaphragm displaceable in a direction to open said throttle valve in response to an increasing fuel pressure imposed thereagainst; means for regulating the fuel pressure in said chamber including fuel supply line means connecting said chamber to said fuel supply means through a normally closed inlet valve therein operable when open to admit fuel under pressure to said chamber, and fuel exhaust line means connecting said chamber to said fuel return line through a normally closed exhaust valve therein operable when open to relieve fuel pressure in said chamber; and temperature controlled means for controlling said inlet valve and exhaust valve including an actuating member having an intermediate position wherein said inlet and exhaust valves are closed, and operative, in response to temperature selecting spring means exerting a force imbalancing said actuating member in one direction past its intermediate position to open said exhaust valve, and in response to produced temperature sensitive means exerting an opposing force imbalancing said member in the other direction past its intermediate position to open said inlet valve.

3. In a fuel valve control system: means supplying fuel under pressure to a burner; a main valve for controlling the rate of fuel discharge into said burner for producing a desired temperature condition, said main valve having spring means biasing it toward one position, and a fluid pressure chamber having displaceable diaphragm means for urging said main valve toward an opposite position in response to an increase in fluid pressure in said fluid pressure chamber; pilot means connected to said fuel supply means and operative to regulate the fluid pressure in said main valve pressure chamber, said pilot valve means including an inlet valve operative when open to pass said fuel to said chamber and thereby increase the pressure in said chamber, and an outlet valve operative when open to exhaust fuel from said pressure chamber and thereby relieve the pressure in said chamber, said pilot valve further including inlet and outlet valve actuating means operable, under a produced temperature condition corresponding to a rate of fuel discharge into said burner providing a selected temperature condition, to assume an intermediate position wherein both said inlet and outlet valves are closed and a static quantity of said fuel is locked in said chamber, and under a condition of imbalance in one direction and another between said selected temperature condition and said produced temperature condition to open said inlet valve and said outlet valve respectively.

4. A control system for a liquid fuel burner comprising: means supplying fuel under pressure; a fuel line leading from said supply means to said burner for producing a temperature condition which is to be controlled; temperature controlled balance means balancing the force of a temperature selecting spring against the force exerted by a temperature responsive element responsive to the temperature produced by said burner to provide a balanced condition when the produced temperature equals the selected temperature condition, and an imbalance in one direction and the other when the produced temperature varies in one direction and the other from the selected temperature condition; a main valve for controlling the rate of fuel discharge into said burner, said main valve including a spring biasing said main valve toward one position, and a housing having a fluid pressure chamber and a diaphragm subject to the fluid pressure therein for correspondingly urging said main valve towards its other position; and means for regulating the fluid pressure in said chamber including a normally closed supply valve between said fuel supply means and said chamber and operative when open to admit fuel to said chamber to increase the pressure therein, a normally closed outlet valve operative when open to release fuel from said chamber to decrease the pressure therein, and actuating means controlled by said balance means and operative, in response to imbalance in one direction to open said supply valve and increase the chamber pressure, and in response to imbalance in the opposite direction to open said outlet valve and decrease the chamber pressure.

References Cited in the file of this patent

UNITED STATES PATENTS

| | | |
|---|---|---|
| 554,398 | Powers | Feb. 11, 1896 |
| 1,671,511 | Carson | May 29, 1928 |
| 2,113,943 | Kimball | Apr. 12, 1938 |
| 2,364,489 | Taylor | Dec. 5, 1944 |
| 2,738,003 | Carey | Mar. 13, 1956 |
| 2,758,591 | Hubbard | Aug. 14, 1956 |